June 24, 1930.  O. C. REEVES  1,767,813
COMPUTING SCALE
Filed March 22, 1922   3 Sheets-Sheet 1
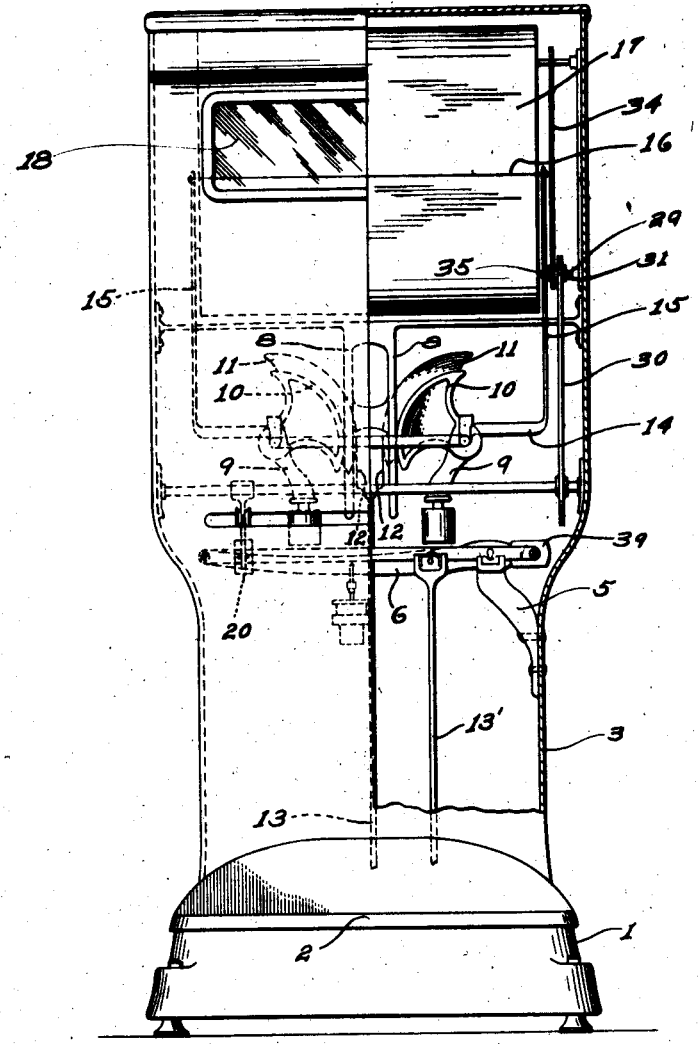
Fig. I.
INVENTOR.
ORWELL C. REEVES.
BY
ATTORNEY.

June 24, 1930.    O. C. REEVES    1,767,813
COMPUTING SCALE
Filed March 22, 1922    3 Sheets-Sheet 2
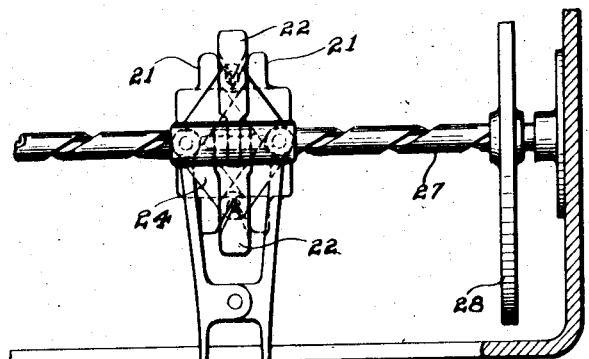
Fig. III.
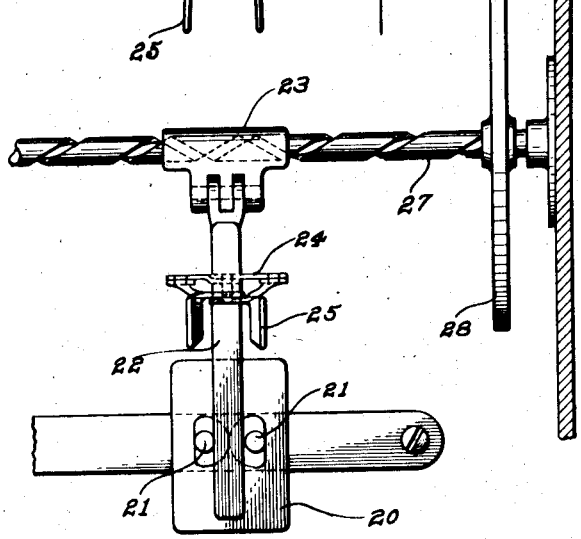
Fig. IV.
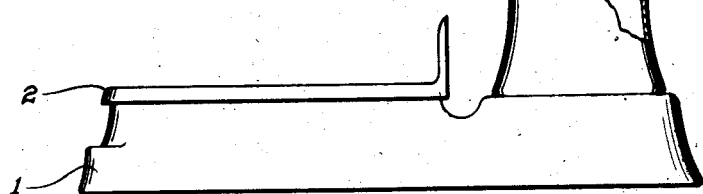
Fig. II.
INVENTOR
ORWELL C. REEVES.
BY
ATTORNEY June 24, 1930.   O. C. REEVES   1,767,813
COMPUTING SCALE
Filed March 22, 1922   3 Sheets-Sheet 3
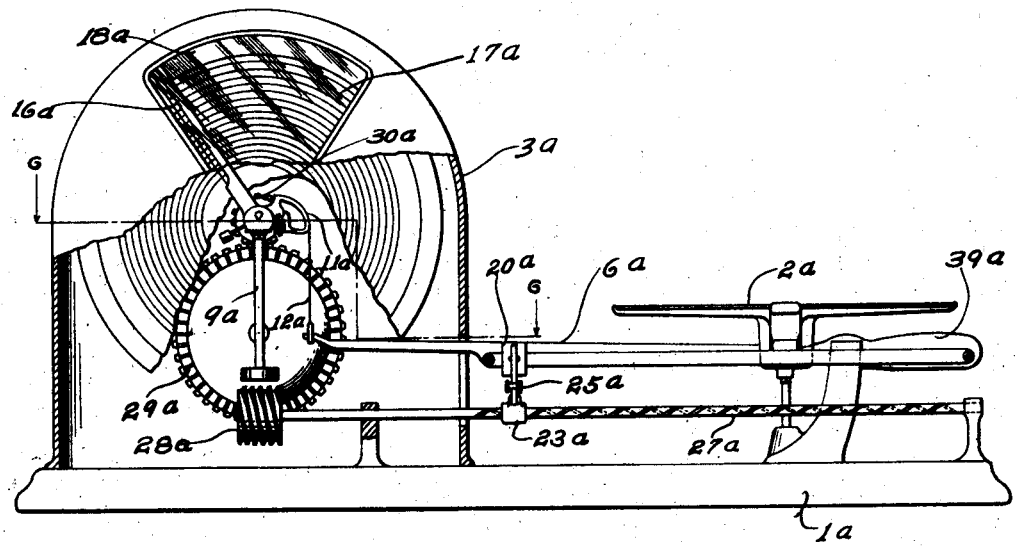
Fig. V.
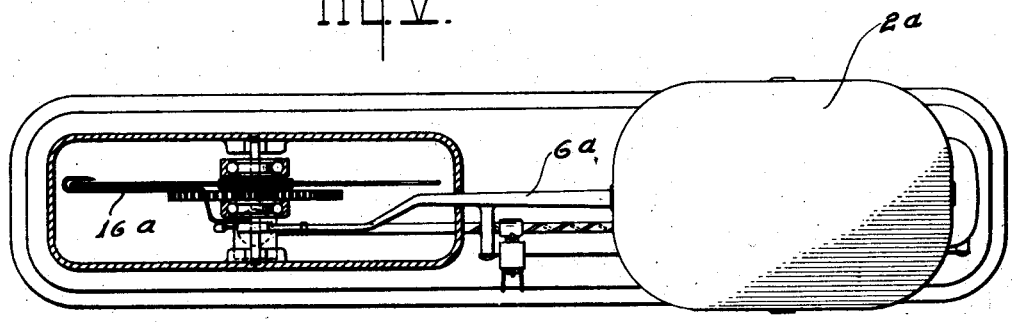
Fig. VI.
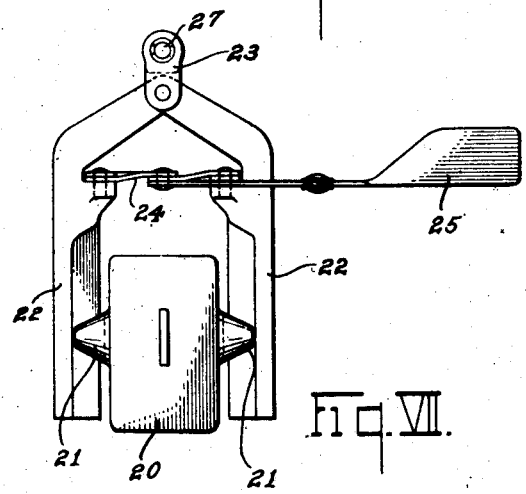
Fig. VII.
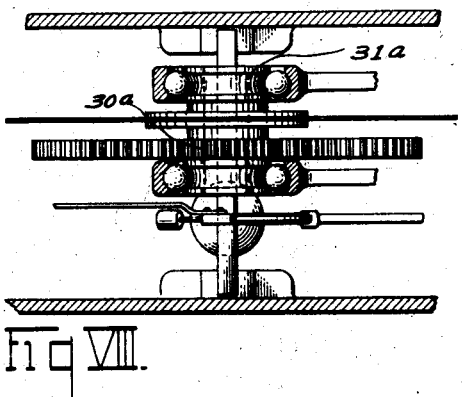
Fig. VIII.
INVENTOR.
ORWELL C. REEVES.
BY *Marshall*
ATTORNEY Patented June 24, 1930

1,767,813

UNITED STATES PATENT OFFICE

ORWELL C. REEVES, OF TOLEDO, OHIO, ASSIGNOR TO TOLEDO SCALE COMPANY, OF TOLEDO, OHIO, A CORPORATION OF NEW JERSEY

COMPUTING SCALE

Application filed March 22, 1922. Serial No. 545,752.

One of the principal objects of my invention is to provide a scale of great sensitiveness and comparatively great capacity.

Another object is to provide a scale having a computing chart and relatively sensitive automatic weighing and indicating mechanism co-operating therewith and manually-operable weighing mechanism for counter balancing portions of the load beyond the normal capacity of the automatic weighing mechanism, means being provided for so connecting the manually-operated weighing mechanism with a computing chart that the total weight and total value computations are indicated upon the chart by the indicator connected with the automatic weighing mechanism.

Another object is to provide a scale having automatic weighing mechanism and manually-operated weighing mechanism so connected that when the manually-operated weighing mechanism is set to counterbalance a part of the load the automatic weighing mechanism will counterbalance the remainder of the load and the total weight and total value computations will be indicated.

Still another object is to provide a scale having manually-operated weighing mechanism and automatic weighing mechanism so connected and arranged that the total weight of the load on the platform will be correctly indicated by an automatic indicator, regardless of the exact setting of the manually-operated weighing mechanism.

Other objects and advantages will be apparent from the following description, in which reference is had to the accompanying drawings illustrating preferred embodiments of my invention and wherein similar reference numerals designate similar parts throughout the several views.

In the drawings:—

Figure I is a front elevation of a scale embodying my invention, part of the housing of the scale being cut away for the purpose of better showing the weighing and indicating mechanism;

Figure II is a side elevation of a scale like that shown in Figure I, other parts of the housing being cut away to better display the mechanism;

Figure III is an enlarged detail plan view showing the connection between the manually-operated weighing mechanism and a device for operating the scale indicator, part of the scale housing being shown in section;

Figure IV is a front elevation of substantially the parts shown in Figure III;

Figure V is a front elevation of a modified form of scale embodying my invention, parts being broken away and parts in section;

Figure VI is a plan view of a scale like that shown in Figure V, parts being shown in section on the line 6—6 of Figure V;

Figure VII is an elevational view of the poise manipulating mechanism; and

Figure VIII is an enlarged detail sectional plan view showing the manner of mounting the indicator and chart of the scale illustrated in Figure V.

Referring to the drawings in detail and particularly to Figures I to IV thereof, the base 1 of the scale supports and houses platform lever mechanism (not shown), which may be of any desired construction and which supports a platform or commodity-receiver 2. Mounted upon the rear end of the base is an upright housing 3, to the wall of which is secured a fulcrum bracket 5 which supports a beam lever 6. A frame 7, which is also rigidly secured to the housing 3, supports the automatic load-off setting mechanism of the scale, which may be of any desired type, such, for example, as the pendulum type or the spring type. Owing to its accuracy and reliability, I prefer, however, to employ load-offsetting mechanism of the type shown in the U. S. patent to Hopgood, No. 1,203,611, dated November 7, 1916. Since any type of automatic weighing mechanism may be employed in the scale of my invention, I have not illustrated the automatic weighing mechanism in detail and will describe it only in such detail as is necessary to clearly show its operation in the scale of my invention and its co-operation with the other parts thereof.

The frame 7 includes a pair of depending guide members 8 upon which are supported a pair of pendulums 9 having curved fulcrum sectors 10 and power sectors 11 curved eccentrically in respect of the fulcrum sectors 10. The power sectors 11 are connected to the platform lever mechanism by means of a pair of flexible metallic ribbons 12 and a steelyard rod 13. When a load is placed upon the platform 2 the steelyard rod 13 is moved downwardly, thus pulling downwardly upon the ribbons 12 and causing the pendulums 9 to swing outwardly, while the fulcrum sectors 10 roll upwardly along the guide members 8.

Pivotally connected to the pendulums 9 on the axes about which the fulcrum sectors 10 are curved is a light frame 14 having vertically extending arms 15 at its ends. Stretched between the upper terminals of the arms 15 is a pair of wires 16, one of which extends across the forward side of the chart 17, while the other extends across the rearward side of the chart. The housing 3 is provided with front and rear windows 18 and 19 through which the wires 16 and the portion of the chart adjacent to the wires are visible. As the pendulums 9 swing outwardly and the fulcrum sectors 10 roll upwardly along the guide members 8, the wires 16 are moved upwardly over the portions of the chart 17 which are visible through the windows 18 and 19. If the chart be marked with suitable graduations and figures corresponding to various weights and prices and the parts be properly arranged and adjusted, the wires 16 will register with the zero indications of weight and price when the commodity-receiver 2 is empty. When a load within the capacity of the automatic weighing mechanism is placed upon the scale, the wires 16 will move upwardly into registration with graduations corresponding to the weight of the article and its value at various prices per pound.

The manipulative load-offsetting mechanism consists of a poise 20 slidably mounted on the beam carried by the lever 6. The poise 20 is provided on its forward and rearward faces with pairs of lugs 21, the lugs being so shaped that the space between each pair of lugs forms a V-shaped notch. A pair of arms 22 pivotally supported upon a slide 23 are so located that the ends of the arms lie between the lugs 21. The arms are connected by toggles 24, to which are pivoted a pair of handles 25, the parts being arranged, as best shown in Figures III and VII, so that when the handles 25 are pressed towards each other the arms 22 are swung into snug engagement with the notches which are formed between the lugs 21. In order that the arms 22 may normally be held out of engagement with the poise, an expansive spring 26 is interposed between the handles 25. The poise is thus free to move with the beam during weighing operation without liability of interference from the arms 22.

The slide 23 is mounted upon a revoluble worm 27, to one end of which is fixed a pulley 28, the pulley 28 being in turn connected to a pulley 29 by means of a belt 30. The pulley 29 is fixedly mounted upon the shaft 31 of a roller 32 upon which is wound the lower end of the chart 17, the upper end of the chart being wound about a second roller 33 rotatably mounted in the upper part of the housing 3. A belt 34 connects pulleys 35 and 36, which are fixed to the shafts of the rollers 32 and 33 respectively. In order to properly position the intermediate portion of the chart 17 between the wires 16 the chart is passed behind guide rollers 37 and 38.

It will be apparent that when the poise 20 is moved by means of the handles 25 the slide 23 is also moved along the worm 27, causing the worm to turn. As the worm turns the pulleys 28, 29, 35 and 36 are also turned and the chart is unwound from the roller 32 and wound upon the roller 33, or vice versa, depending upon the direction of movement of the poise.

The lever 6 is provided with a counterweight 39 which counterbalances the weight of the lever and the poise 20 when the poise is in zero position at the left end of its beam. As the poise is moved to the right, the counterweight 39 offsets a larger and larger part of the load on the platform. The mechanism is so proportioned that when the poise is moved to the right a sufficient distance so that 2 lbs. of the load on the platform are counterbalanced by the counterweight 39, the chart 17 is moved downwardly the same distance that the wires 16 move upwardly when the pendulums swing to a position in which they offset 2 lbs. If the poise is in zero position, the wires 16 will register with the zero graduations on the chart 17. If a load of—say 3 lbs.—be now placed upon the platform 2 the pendulums will swing outwardly and the wires 16 will move upwardly into registration with the 3 lb. graduations on the chart 17. If the poise 20 be now moved to the right far enough so that the counterweight 39 offsets 2 lbs. of the weight on the platform 2, the pendulums 9 will, of course, swing downwardly, as part of the pull on the steelyard rod 13 is taken up by the steelyard rod 13'. The wires 16 will move downwardly two-thirds of the way to their original positions, but the chart 17 will also be moved downwardly by means of the worm and pulley mechanism the same distance, so the wires 16 will still be in registration with the 3 lb. graduation.

If the weight on the platform 2 is so great as to be beyond the capacity of the pendulum weighing mechanism, it is only necessary to move the poise 20 to the right until the automatic weighing and indicating mechanism vibrates freely and it will come to rest with the wires 16 in registration with the graduations on the chart corresponding to the weight of the load on the commodity-receiver.

In the form of device shown in Figures V, VI and VIII the base 1ª supports a lever 6ª which carries the platter or commodity-receiver 2ª, the lever being connected by means of a flexible metallic ribbon 12ª and a power sector 11ª to a load-offsetting pendulum 9ª. The lever 6ª is equipped with a sliding poise 20ª and a counterpoise 39ª which substantially counterbalances the weight of the lever 6ª, the commodity-receiver 2ª and the sliding poise 20ª. When a load is placed upon the commodity-receiver 2ª the pendulum 9ª is swung upwardly and to the left, and an indicator 16ª swings over a portion of a circular chart 17ª which is exposed through a window 18ª on the forward side of the housing 3ª which encloses the automatic load-offsetting and indicating mechanism. The rear side of the chart is provided along its edge with weight graduations and a corresponding portion of the chart is visible through a window in the rear of the housing. The indicator 16ª is provided with a pointer which is bent around the edge of the chart and indicates the weight graduations on the rear side thereof (see Figure VI). The poise 20ª is moved by means of a pair of handles 25ª like those described as a part of the form of device shown in Figure 1, the poise manipulating mechanism being connected to a slide 23ª which turns a worm 27ª that is connected through suitable gearing 28ª, 29ª, 30ª to the hollow shaft 31ª which carries the circular chart 17ª, the shaft 31ª being suitably mounted in ball bearings, as shown in Figure VIII, and the pivot of the indicator extending through the shaft with its knife edge lying along the center thereof so that the chart and the indicator swing about the same axis of movement.

The parts are so arranged and adjusted that when the poise 20ª is in the position shown in Figure V and the commodity-receiver is empty, the indicator 16ª is in registration with the zero graduations on the chart 17ª. If a weight of—say 3 lbs.— be placed upon the commodity-receiver 2ª, the indicator 16ª will swing into registration with the 3 lb. graduations on the chart. If the poise 20ª be now moved to the right a short distance, the chart 17ª will be revolved to the left by means of the worm 27ª and gearing 28ª, 29ª, 30ª, and the indicator 16ª will swing to the left through exactly the same angle so that it will remain in registration with the 3 lb. graduations on the chart. It is apparent, therefore, that the indicator will correctly indicate the weight on the commodity-receiver regardless of the exact position of the poise 20ª so long as the poise is in such position that the automatic weighing mechanism may swing freely to a position of balance. The indicator 16ª swings through an angle of slightly over 60° so that the total capacity of the circular chart 17ª may be more than five times that of the automatic indicating mechanism. By thus combining the movable chart with the automatic weighing mechanism I have provided a scale which is capable of computing money values throughout the capacity of the hand-operated poise weighing mechanism as well as that of the automatic weighing mechanism.

While it will be apparent that the illustrated embodiments of my invention herein disclosed are well calculated to adequately fulfill the objects primarily stated, it is to be understood that the invention is susceptible to variation, modification and change within the spirit and scope of the subjoined claims.

Having described my invention, I claim:

1. In a weighing scale, in combination, a commodity-receiver, automatic load-offsetting mechanism connected to said commodity-receiver, manipulative load-offsetting mechanism connected to said commodity-receiver, means for manipulating said manipulative load-offsetting mechanism, and an indicating device comprising relatively movable elements, one of said elements being connected to and moved by said automatic load-offsetting mechanism, the other element being connected to and moved by the means for manipulating said manipulative load-offsetting mechanism, the parts being so proportioned and arranged that movement of the automatic load-offsetting mechanism or movement of the manipulative load-offsetting mechanism to counterbalance a given load on the platform will cause equal relative movement of the elements of the indicating device.

2. In a weighing scale, in combination, a lever, a commodity-receiver connected thereto, a beam carried by said lever, a weighing poise slidably mounted on said beam, means for moving said weighing poise along said beam, a movable chart, means connecting said chart and said poise moving means whereby said chart is moved proportionately to the movement of said poise, automatic load-offsetting mechanism connected to said lever, and an index connected to said automatic load-offsetting mechanism and adapted to co-operate with said chart.

3. In a weighing scale, in combination, a lever, a commodity-receiver connected thereto, a beam carried by said lever, a poise slidably mounted on said beam, means for moving said poise along said beam, a revoluble chart, means connecting said chart and said poise moving means whereby said chart is revolved proportionately to the movement of said poise, automatic load-offsetting mechanism connected to said lever, and an index connected to said automatic load-offsetting mechanism and mounted to swing about a pivotal axis substantially coincident with the axis of movement of said chart.

4. In a weighing scale, in combination, a revolubly mounted chart, a swingingly mounted index, the axes of movement of said chart and index being substantially coincident, automatic load-offsetting mechanism, manipulative load-offsetting mechanism, and means connecting said index and chart to said automatic load-offsetting mechanism and said manipulative load-offsetting mechanism whereby when said automatic and manipulative load-offsetting mechanisms are moved into position for counterbalancing the load the relative movement of said index and chart is the same regardless of whether the load is counterbalanced by one or the other or both of said load-offsetting mechanisms.

5. In a weighing scale, in combination, a lever, a commodity-receiver connected thereto, a beam carried by said lever, a poise slidably mounted upon said beam, said poise being provided on its opposite sides with notches, means for moving said poise comprising a pair of arms engageable in said notches, means normally holding said arms out of engagement with said notches, and means for moving said arms into engagement with said notches, a slide supporting said arms, a worm supporting said slide and adapted to be turned by movement thereof, and in indicating element connected to said worm.

6. In a weighing scale, in combination, a lever, a commodity-receiver connected thereto, a beam carried by said lever, a poise slidably mounted upon said beam, said poise being provided on its opposite sides with notches, means for moving said poise comprising a pair of arms engageable in said notches, means normally holding said arms out of engagement with said notches, and means for moving said arms into engagement with said notches, a slide supporting said arms, a worm supporting said slide and adapted to be turned by movement thereof, an indicating element connected to said worm, automatic load-offsetting mechanism connected to said lever, and an indicating element connected to said automatic load-offsetting mechanism and adapted to co-operate with the first said indicating element.

7. In a weighing scale, in combination, a beam, a poise movable longitudinally thereof to counterbalance various loads, automatic weighing mechanism, a relatively movable chart and index, and means operatively co-ordinating said chart and index, the one with said poise and the other with said automatic weighing mechanism whereby said chart and index are moved relatively to each other proportionally to the load-counterbalancing effect of said poise and/or said automatic weighing mechanism.

8. In a weighing scale, in combination, a beam, a poise movable thereon to counterbalance various loads, automatic weighing mechanism, a relatively movable chart and index, and means whereby equal relative movement is imparted to said chart and index by movement of either said poise or said automatic weighing mechanism to counterbalance equal loads.

ORWELL C. REEVES.